United States Patent [19]

Macintosh

[11] Patent Number: 5,103,769
[45] Date of Patent: Apr. 14, 1992

[54] DEVICE FOR DETERRING PETS

[75] Inventor: Laurie Macintosh, Stow, Mass.

[73] Assignee: Paws Off, Inc., Stow, Mass.

[21] Appl. No.: 536,438

[22] Filed: Jun. 12, 1990

[51] Int. Cl.$^5$ .............................................. A01K 29/00
[52] U.S. Cl. .......................................... 119/29; 43/81
[58] Field of Search ............... 119/1, 29; 43/81, 83, 43/71, 82, 72; 135/24; 446/406, 418; 272/27 N, 27 R

[56] References Cited

U.S. PATENT DOCUMENTS

| | | | |
|---|---|---|---|
| 2,060,161 | 11/1936 | Altmann | 52/101 |
| 2,142,371 | 1/1939 | Peles | 52/101 |
| 2,258,803 | 10/1941 | Peles | 52/101 |
| 3,157,000 | 11/1964 | Stavig | 119/29 |
| 3,990,177 | 11/1976 | Daraux | 446/418 |
| 4,110,944 | 9/1978 | Carlson | 52/101 |
| 4,147,129 | 4/1979 | Ruplen | 119/19 |
| 4,539,936 | 9/1985 | Majewski | 119/29 |
| 4,779,374 | 10/1988 | Feldman | 43/81 |
| 4,860,776 | 8/1989 | McQuain | 135/24 |

FOREIGN PATENT DOCUMENTS 282589  5/1914  Fed. Rep. of Germany ........ 119/29

OTHER PUBLICATIONS

Solutions Catalogue, advertisement, "Train Pets To Stay Off Your Furniture and Carpets with the Invisible Gate".
Solutions Catalogue, advertisement, "Teach Your Pet Better Manners with Safe, Effective Scat Mat".
Advertisement, "Talk to Animals-Even When You're Not Home!".
Advertisement, "Dog-Proof Your Home, Complete Convenience Proven Effectiveness, Proven Safety and Invisible Fencing".
Advertisement, "Pet Peeve-Keeps Pets Off the Furniture".
Advertisement, "Claws Off".

*Primary Examiner*—John G. Weiss
*Attorney, Agent, or Firm*—Hamilton, Brook, Smith & Reynolds

[57] ABSTRACT

The present invention relates to a device for deterring animals from engaging in prohibited behavior. A flap pivots about retainers mounted on a base. An elastic member extends from under the base to a protruding tab on the flap. Disturbance of the base, such as by the undesired activity of a pet, causes movement of the flap relative to the base and contraction of the elastic. The flap accelerates about the retainers and impacts against the base. This generates a sharp startling sound and movement of the device which acts to discontinue the activity and deter the animal from the repeated occurrence of such behavior.

16 Claims, 3 Drawing Sheets

DEVICE FOR DETERRING PETS

BACKGROUND OF THE INVENTION

The present invention relates to the field of animal training devices, and more particularly to an apparatus and method for negative reinforcement of undesired animal behavior activated by the undesired activities of pets.

Implements used to train domestic animals against activities which are disruptive to property within the home are in particular demand when there are frequent periods of absence or inattention by their owners. Negative reinforcement is especially difficult because of the need for reliable performance of devices used to obtain the desired results as a consequence of training.

Training tools designed to keep pets off or away form articles or furniture or specific areas of a house have included chemical sprays, barriers, batter-powered alarms, electric wires and "electric blankets" which deliver an electric shock to the pet. Chemical sprays have been hampered by problems of diminishing effectiveness over time caused by chemical breakdown, dissipation, limited effectiveness and damage to delicate furniture and fabrics. Chemicals are also often noxious and possibly harmful to young children. Physical barriers designed to prevent access to rooms by animals are difficult to install and are obtrusive to members of the household. Battery-powered devices are unreliable because of limited battery life and quite often are startling to inhabitants of the house and are visually unappealing.

A reliable deterrent to specific activities of animals is needed which is safe, predictable, unobtrusive and innocuous.

SUMMARY OF THE INVENTION

An apparatus and method for providing a sharp snapping noise triggered by external motion, in which a flap moves from a set position to a released position to deter household pets from returning to the object or location where the device has been placed. A preferred embodiment of the device comprises a base with a top surface to which a pair of retainers are fastened or integrally formed. The flap has a pair of feet, each being dimensioned configured for rotation within one of the retainers. The flap is conducted through a pivotal rotation relative to the stationary retainers by an elastic member such as an elastic band to impact the base and create noise and movement that is startling to the animal.

In the set position the flap is held substantially parallel to the base. An elastic member extends from a slot and over an edge of the base to the flap. The elastic is seated within at least on notch in the edge. The retainers are laterally opposed, providing an axis about which the flap rotates. The elastic forms a span under tension extending from the edge across the surface of the base and the flap to suspend the flap relative to the retainers in the set position. The flap has an arch extending between the feet including a recessed portion that provides a construction utilizing a minimal amount of material.

In this embodiment, the flap is provided with a protruding tab extending radially from the flap for maintaining the elastic in an extended postion between the flap and the edge of the base. The slot within the base has a base tab for maintaining the elastic in an extended position between the slot and the edge of the base. A retension mechanism is positioned on the top of the base adjacent to the tab on the flap. The retension mechanism can include a rigid support secured to the base and a retaining arm or member that is pivotably mounted on the support and has a notch that is positioned to engage the tab of the flap and hold the flap against the force exerted thereon by the elastic. The notch has a geometry such that a slight movement of a surface upon which the base is placed will cause the retaining arm to move relative to the tab resulting in the release of the flap. The upper edge of the tab on the flap is bevelled to engage the notch.

In another preferred embodiment, the flap within the set position, the extension of the elastic through the axis of the retainers to suspend the flap substantially parallel to the base causes the flap to be highly sensitive to disturbances such as slight changes of position. Relative movement between the base and the flap resulting from any disturbance of the base actuates the flap by destabilizing the force of the elastic on the flap. The flap is thus movable to a released position whereby the elastic span is directed away from the pivot axis and accelerates the flap which then impacts against the base to make a loud noise and causes the entire device to move.

A method for deterring a household pet from jumping onto furniture or from entering a forbidden area involves impacting a flap against a base. Actuation of the flap is accomplished by placement of the base on an article subject to movement by the undesired presence of a pet. In one embodiment the article and the device can be covered with a material familiar to the pet or substantially similar to the texture and appearance of the surface supporting the device. Disturbing the base by movement of the supporting article releases a retaining mechanism holding the flap against the tension of an elastic. The elastic then contracts by continuously rotating the flap about the axis that extends through the retainers. The flap thereby accelerates and impacts the top side of the base which terminates the rotation. Energy absorbed by the flap and the base during impact creates a loud noise and movement of the entire device thereby averting the pet from further disturbance of the supporting article upon which the base has been placed.

The above features and other aspects of the invention, either as combinations and parts of the invention or as steps of the method will now be more particularly described with reference to the accompanying drawings and pointed out in the claims. It will be understood that the embodiments of the invention are shown by way of illustration only and not as limitations of the invention. The principal features of this invention may be employed in various embodiments without departing from the scope of the invention.

DETAILED DESCRIPTION OF THE INVENTION

The device for deterring pets of the present invention provides a movement-sensitive releasable impact device for creating a sharp sound and movement as an averting mechanism and deterrent to disturbance by pets of articles on which the invention is placed. An elastic is drawn across a base to a flap where the elastic extends perpendicular to an axis about which the flap moves. Disturbance of the base causes relative motion of the flap and movement of the elastic away from the axis, actuating contraction of the elastic and acceleration of the flap to impact the flap against the base thereby creating a loud sound. Activation caused by the household pet jumping onto furniture, onto stairs or onto a floor covering on which the invention has been placed will startle the animal and provide negative reinforcement for the deterrence of further such activity.

Figure 1:
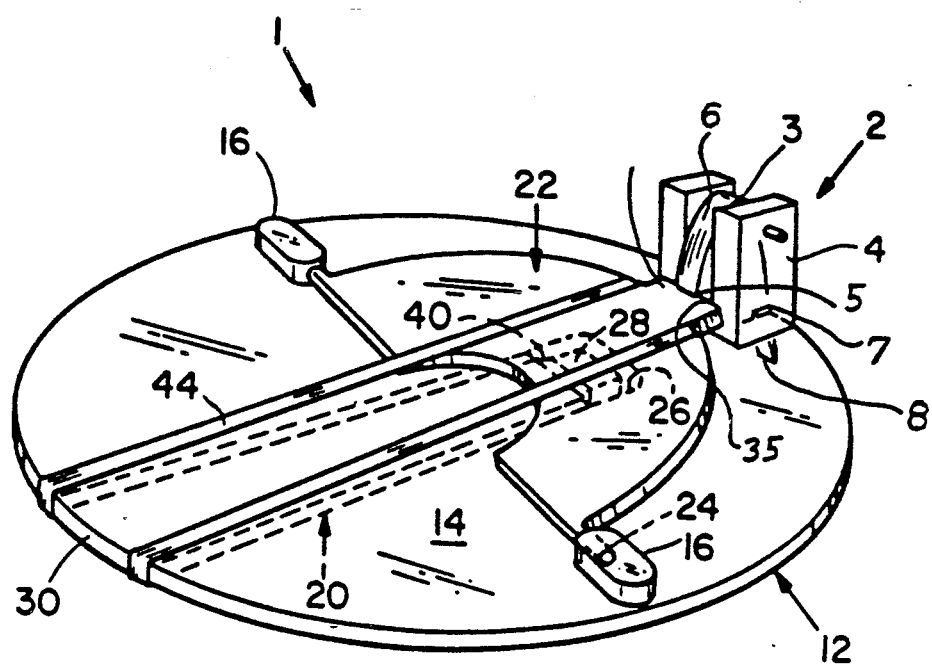
FIG. 1 is a perspective view of a preferred embodiment of the device using a retension mechanism.

A preferred embodiment of the invention is illustrated in FIG. 1 where a retension mechanism 2 is positioned on the top of the base 12 adjacent to the tab 34 on the flap 22. This mechanism 2 includes a rigid support 4 mounted on or integrally formed with the base 12 and a retaining arm or member 3 that is pivotably mounted on the support 4. The member 3 has a notch or groove 5 extending across a surface 6 such that the groove 5 can engage an edge portion 35 of the tab 34 and prevent the rotation of the flap 22 under tension by the elastic 20. The edge portion 35 of tab 34 can be bevelled to engage the retaining member 3 with the proper force. The groove 5 is dimensioned such that a slight movement of the member 3 will cause the flap 22 to be released by the retension mechanism 2 and undergo rotation to the released position.

The embodiment of FIG. 1 can further include an opening 7 in the base 12 which receives a lower portion of member 3 that can extend through the plane of the base 12 to a point 8 below the base when the member 3 retains the tab 34. Note that the point 8 of the member 3 operates to raise one side of the base 12 above the support surface and is free to rotate relative to the base 12 such that a movement of the support surface will result in relative movement of the base 12 and member 3 thereby causing release of the flap 22.

Figure 2:
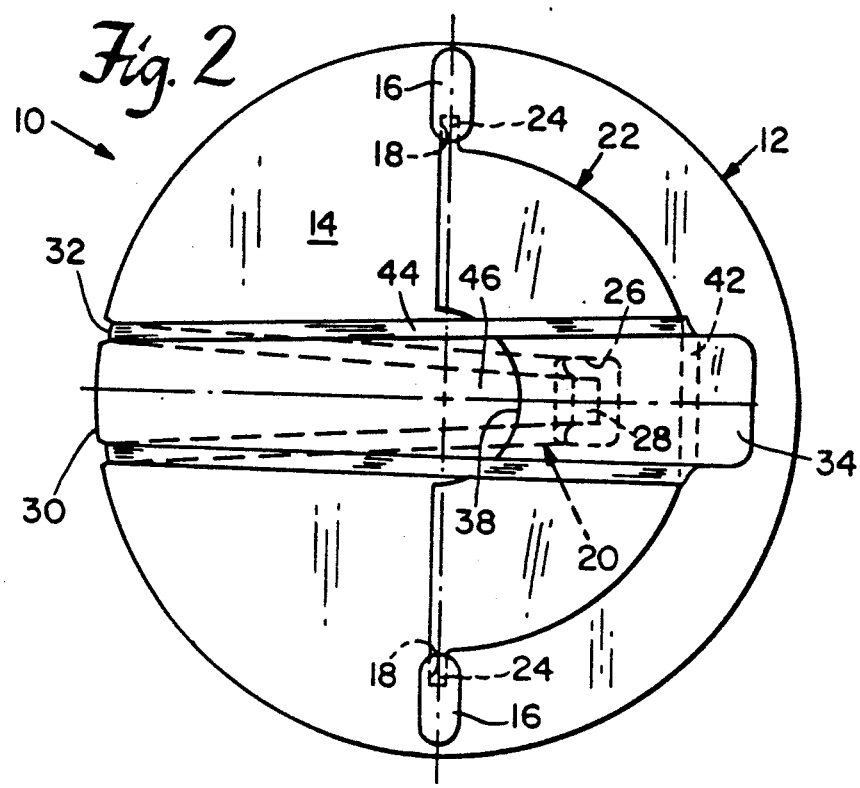
FIG. 2 is a plan view of the repelling device of the present invention in the set postion.

FIG. 2 is a plan view of another preferred embodiment of a device for deterring pets 10. Base 12 has retainers 16 laterally opposed to each other and fixed to top face 14. Flap 22 has feet 24 dimensioned and configured to fit within apertures 18 of retainers 16. Apertures 18 are elevated from top face 14. The flap 22 and base 12 can be constructed of lexane, styrene, lucite or any other lightweight rigid material. Base 12 is approximately 4 inches in diameter. The flap 22 rotates about an axis, defined by retainers 16, which bisects top face 14 of base 12.

Figure 3:
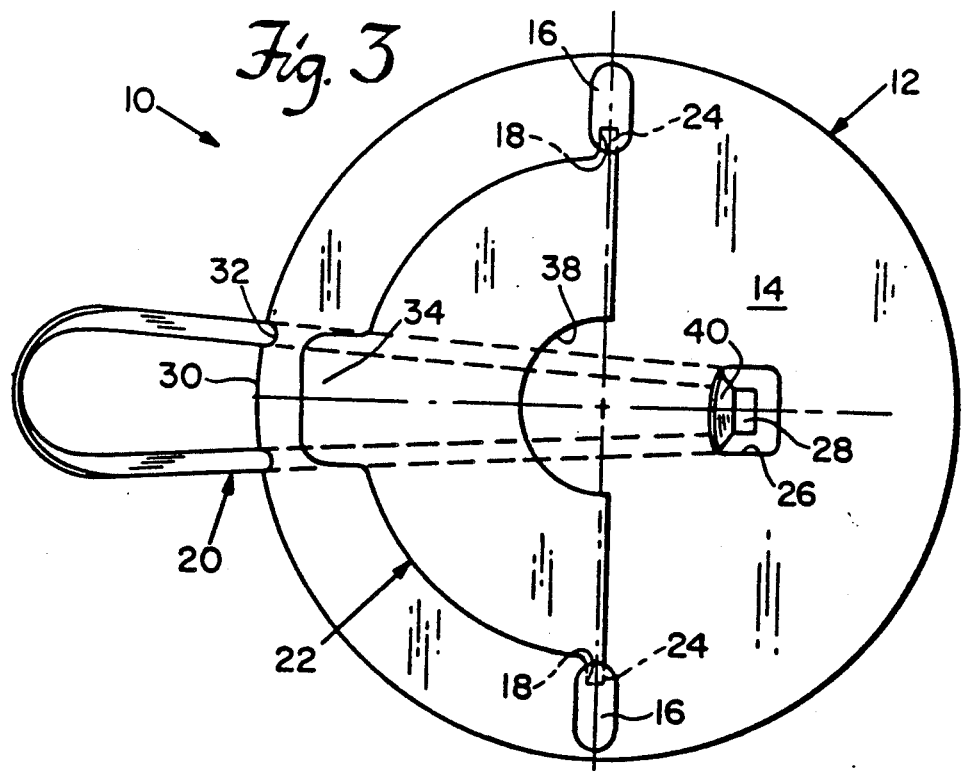
FIG. 3 is a plan view of the repelling device in the released position.
Figure 4:
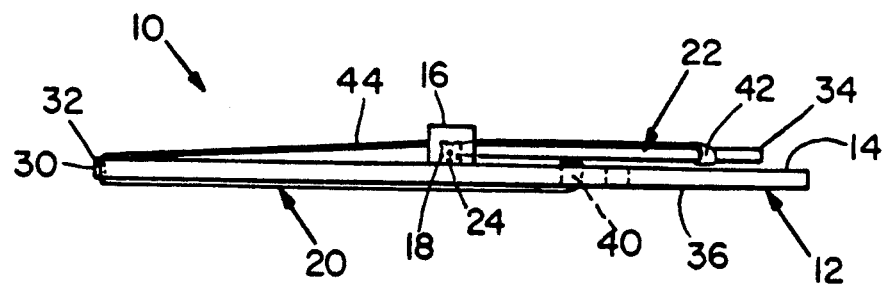
FIG. 4 is a side view of the device for repelling pets in the set position taken along Line A—A of FIG. 1.

In the "set" position, shown in FIG. 2 and in FIG. 4, the flap 22 lies substantially parallel to base 12 and opposite notches 32. As seen in FIG. 2, arch 38 extends between feet 24 to create a recessed portion 46 between flap 22 and feet 24. A first end 40 (See FIG. 3) of elastic 20 extends about base tab 28 for securing the elastic to base 12. Elastic 20 extends across bottom face 36, around edge 30, and across top surface 14 to the flap 22. Edge 30 of the base 12 has notches 32 for receiving elastic 20. A second end 42 of elastic 20 is secured to flap 22 about protruding tab 34, forming a span 44 of elastic 20 between protruding tab 34 and notches 32.

Span 44 crosses the axis about which the flap rotates, and extends across the recessed portion 46. Tension within elastic 20 along span 44 is opposed by the force exerted by the retainers 16 against feet 24. Span 44 is substantially parallel to the flap 22 and maintains the flap 22 in the set position. The flap 22 is thus held in position by retainers 16 and elastic 20. Freedom of rotation of the flap 22 about feet 24 causes the position of flap 22 to be sensitive to changes in relative position between base 12 and flap 22.

Figure 5:
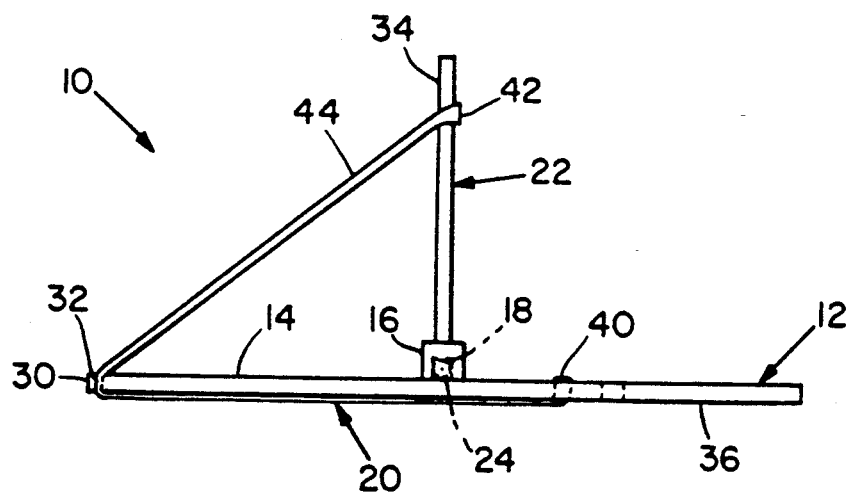
FIG. 5 is a side view of the repelling device in a released position during rotation of the flap about the retainers.

The flap 22 is actuated by some displacement or vibrational disturbance of base 12. Sudden changes of position in the base 12 are transferred to flap 22 through retainers 16, generating changes in the tension applied to the flap 22 by the elastic 20. As a consequence, the flap 22 and protruding tab 34 are rotated about retainers 16, directing span 44 away from base 12. A torque is thus generated by tension within span 44 between protruding tab 34 and notches 32 by the elastic 20, thereby actuating the flap 22 from the set position to a partially released position as shown in FIG. 5. The stretched elastic 20 then fully contracts, reducing the distance between the flap and the edge 30 of the base from where the elastic extends. Contraction of span 44 applies continued force to flap 22 so that the flap accelerates during rotation about retainers 16. Contraction of elastic 20 is rapid and provides sufficient momentum in the flap to produce the desired noise and movement of the device.

As shown in FIG. 3, elastic 20 slips from tab 34 when momentum generated in the elastic rotates span 44 away from one side of flap 22. The flap 22 rotates freely about retainers 16 and impacts the top surface 14 of base 12, thereby stopping rotation. Momentum generated in flap 22 by elastic 20 is dissipated by base 12 and flap 22 in part by vibration which generates a sharp sound that is loud enough to startle and deter domestic pets from repeating the undesired behavior. The movement of the flap and the entire unit also serves to startle pets and deter repetition of this behavior.

Figure 6:
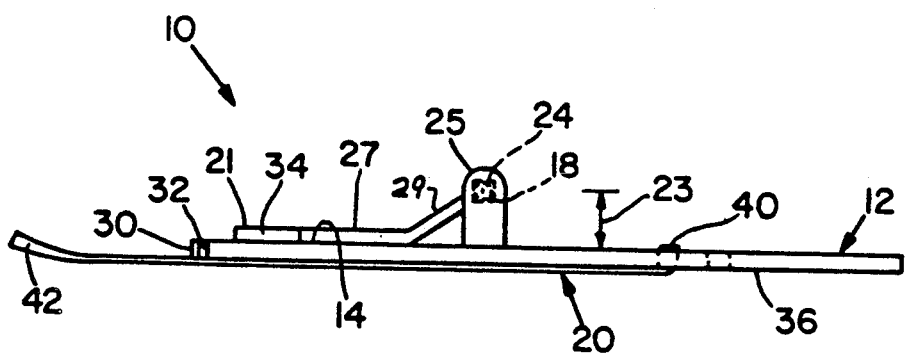
FIG. 6 is a side view of the repelling device in a released position at impact of the flap against the base.

FIG. 6 illustrates another preferred embodiment of the device in the released position in which the flap 21 is mounted on retainers 17 a distance 23 above the base 12. The flap 21 in this embodiment is angled along an axis that is parallel to the axis 25 about which the flap 21 rotates. This flap 21 is thus molded into two planar regions 27, 29. Region 27 is parallel to the base when the flap 21 is in the released position. By elevating the axis 25 of rotation of the flap above the plane of the base the amount of vibration or displacement of the base that is necessary to cause release of the device increases.

The flap 21 may be reset from the released position by drawing elastic 20 to a more extended position across bottom 36 of base 12, around edge 30 through notches 32, and about protruding tab 34. The flap 21 is subsequently rotated by hand about retainers 16 to top face 14. Elastic 20 will then be fully extended between base tab 24 notches 32 and protruding tab 34. The flap 21 will be suspended by span 44, and the set position of the invention re-established. Base 12 can then be replaced on the supporting article to continue acting as a deterrent to repeated behavior.

I claim:

1. A device for deterring behavior of a pet comprising:
   a base positionable on a support surface;
   an elastic member coupled to the base;

a retaining member mounted on the base comprising a pair of laterally opposed retainers fixed to the base, each retainer having an aperture therein;

a flap, pivotably mounted on the base by a pair of feet which are each inserted in an aperture, the flap being coupled to the elastic member and having a set position wherein the elastic member extends under tension between the base and the flap that is held in the set position by the retaining member, the flap being rotable to a released position, rotation of the flap from the set position to the released position under tension applied to the flap by the elastic member being such that the flap impacts the base to generate a sound sufficient to deter the pet, the flap further comprising a recessed portion extending between the feet to receive the elastic member that extends across a pivot axis of the flap in the set position.

2. The device of claim 1 wherein the base further comprises a slot extending through the base and a base tab extending within the slot to couple the elastic member to the base.

3. The device of claim 2 wherein the flap further comprises a protruding tab extending radially from the flap for securing the elastic member to the flap.

4. The device of claim 3 wherein the base further comprises a bottom face and an edge, the elastic member extending from the base tab, across the bottom face and the edge, and from the edge to the flap to form a span extending from the edge to the flap.

5. The device of claim 4 wherein the edge further comprises notches for receiving the elastic member.

6. The device of claim 3 wherein the tab has a bevelled upper edge.

7. A device for deterring pets comprising:
a base positionable on a support surface;
an elastic member coupled to the base;
a retension mechanism extending from a top surface of the base, the mechanism having a pivotably mounted retension member that rotates about an axis and has a groove extending across a surface of the member;
a flap pivotably mounted on the base and coupled to the elastic member, the flap having a set position with the elastic member extending under tension between the base and the flap such that the flap contacts the member at the groove therein and is held by the member until relative movement between the member and the base causes release of the flap from the groove and rotation of the flap under tension from the elastic member to impact the base.

8. The device of claim 7 where the retension member extends through an opening in the base to contact the support surface underlying the base.

9. A method for deterring pets comprising:

providing a deterring device having a base, a flap and an elastic member;

providing retainers secured to the base, the retainers having apertures for receiving feet extending from the flap thereby permitting rotation of the flap relative to the base;

providing an arch on the flap extending between the feet for receiving the elastic member through a pivot axis bout which the flap rotates;

extending the flap that is pivotally mounted on the base such that the elastic member is secured to the base and the flap and is under tensile stress to hold the flap in a set position relative to the base;

positioning the deterring device on a support surface;

actuating movement of the device from a movement of the support surface in response to activity of a pet on the support surface to cause release of the flap from the set position;

contracting the elastic member to rotationally accelerate the flap relative to the base; and impacting the flap against the base to generate a noise to deter the activity of pet.

10. The method of claim 9 further comprising providing a slot through the base and a base tab extending within the slot for securing the elastic member to the base and a protruding tab extending radially from the flap for securing the elastic member to the flap.

11. The method of claim 9 wherein the impacting step comprises imparting movement to the base.

12. A method for deterring pets comprising:
drawing an elastic member, that is secured at a first end to a base, across an edge of the base to a protruding tab on a flap for securing a second end of the elastic member, to form a span extending from the edge to the flap which is elevated from the base;
suspending the flap in a set position above the base, the elastic member holding the flap against retainers along an axis substantially parallel to the flap;
releasing the flap from the set position by moving the base relative to the flap and thereby directing the member away from the pivot axis;
accelerating rotation of the flap about the retainers by contracting the elastic member; and
impacting the flap against the base to generate a noise.

13. The method of claim 12 wherein the impacting step further comprises imparting a motion to the base to deter the pet.

14. The method of claim 12 further comprising concealing the base and flap during operation thereof.

15. The method of claim 14 further comprising positioning the base on a moveable support surface.

16. The method of claim 15 further comprising concealing the base and flap with a flexible material substantially similar to a material covering the support surface.

* * * * *